United States Patent [19]

Hench et al.

[11] Patent Number: 4,851,150
[45] Date of Patent: Jul. 25, 1989

[54] DRYING CONTROL CHEMICAL ADDITIVES FOR RAPID PRODUCTION OF LARGE SOL-GEL DERIVED SILICON, BORON AND SODIUM CONTAINING MONOLITHS

[75] Inventors: Larry L. Hench; Gerard F. Orcel, both of Gainesville, Fla.

[73] Assignee: University of Florida, Gainesville, Fla.

[21] Appl. No.: 583,741

[22] Filed: Feb. 27, 1984

[51] Int. Cl.$^4$ .................. B01J 13/00; B29C 39/02
[52] U.S. Cl. .................. 252/315.6; 264/42; 501/12
[58] Field of Search .................. 264/42; 501/12; 252/315.6; 423/338

[56] References Cited

U.S. PATENT DOCUMENTS

| | | | |
|---|---|---|---|
| 3,672,833 | 6/1972 | Teichner et al. | 423/338 |
| 3,791,808 | 2/1974 | Thomas | 501/12 |
| 4,323,381 | 4/1982 | Matsuyama et al. | 501/12 |

FOREIGN PATENT DOCUMENTS 58-176135  10/1983  Japan .................. 423/338

OTHER PUBLICATIONS

Gonzalez-Oliver, Glass Ceramic Formation and the Preparation of Glasses by the Sol-Gel Method, in Glass, Aug. 1981, pp. 304, 305, 307.

*Primary Examiner*—Richard D. Lovering
*Attorney, Agent, or Firm*—Finnegan, Henderson, Farabow, Garrett and Dunner

[57] ABSTRACT

Large sol-gel derived silicon-containing monoliths are prepared with the use of drying control chemical additives selected from the group consisting of glycerol, formamide, oxalic acid and acids of the formula $C_nH_{2(n-1)}O_2N$ to control the ultrastructure of the gel solid and pore phases. Gelation, aging, drying, and densification of the sol-gel derived monoliths may be performed rapidly in tens of hours instead of tens of days without cracking, final densification at temperature of 800° C to 1200° C. or less being possible. The silicon-containing monolith comprises a ternary $SiO_2$—$B_2O_3$—$Na_2O$ system.

8 Claims, No Drawings

DRYING CONTROL CHEMICAL ADDITIVES FOR RAPID PRODUCTION OF LARGE SOL-GEL DERIVED SILICON, BORON AND SODIUM CONTAINING MONOLITHS

This invention was made with Government support under F49620-80-C-0047 awarded by the Air Force. The Government has certain rights in this invention.

BACKGROUND OF THE INVENTION

1. Field of the Invention

The present invention relates to sol-gel derived silicon-containing monoliths which are crack-free and suitable for firing to produce dense ceramic shapes. The use of specific additives, drying control chemical additives (DCCA), during the mixing phase of sol-gel process makes possible the production of large scale fully dried crack-free monolithic gels routinely and rapidly.

2. Description of the Prior Art

The production of ceramic powders by the sol-gel process has been known for many years. For example, Thomas, U.S. Pat. No. 3,791,808, discloses a process for the production of a thermally crystallizable oxide product formed by hydrolyzing a silicon alkoxide with water in the presence of a catalytic amount of acid hydrolysis catalyst to prepare a clear solution of a partially hydrolyzed silicon alkoxide, reacting the partially hydrolyzed product to form a clear gel, heating the gel to substantially remove organic and free liquid components, and converting the gel to thermally crystallizable oxide product having a particle size of less then amount 0.2 microns.

Recently, this low temperature chemical processing method has been investigated for preparation of monolithic objects. And while there are many potential advamtages to sol-gel processing such as the ability to produce uniquely homogeneous solids of unique composition ranges, better purity, lower temperature of preparation, tighter grain size control, greater surface smoothness, better control of densities, and the potential for recycling defective gel products prior to firing, the non-homogeneous pores that are present in the solid after gelation usually lead to catastrophic failure of the piece during drying due to the development of large capillary stresses. These large capillary stresses occur when differential evaporation rates takes place from capillaries intersecting the surface. When the gel strength is low, the surface cannot withstand the non-homogeneous stress, thereby resulting in fracture of the article. Among the methods employed by the prior art in an effort to circumvent the cracking of the monolith during the drying process are (1) increasing the mechanical strength of the gel by aging, (2) diminishing the magnitude of capillary forces by enlarging the pore size and/or decreasing the surface energy by use of surfactacts, (3) reducing the rate of evaporation of the solvent from the pores by use of a semipermeable membrane during drying, (4) elimination of the pore liquid-solid interface by hypercritical evacuation, and (5) freeze drying. However, application of these very methods in rapid, routine production of large scale, fully dried monoliths is unreliable, uneconomical, and extremely difficult. None of these prior art methods have proven capable of meeting the current industry requirements for production of large objects in a short time frame.

Thus, a need has continued to exist for large sol-gel derived silicon-containing monoliths which can be quickly dried, aged, and densified to crack-free shaped articles and a method for producing these monoliths.

SUMMARY OF THE INVENTION

It is an object of the present invention to produce large sol-gel derived silicon-containing monoliths.

It is a further object of the present invention to produce large sol-gel derived silicon-containing monoliths which are crack-free.

It is still a further object of the present invention to produce large sol-gel derived silicon-containing crack-free monoliths rapidly and reliably.

It is yet a further object of the present invention to produce large sol-gel derived silicon-containing monoliths having large surface aeas which promote rapid drying, aging and densifying.

It is yet a further object of the present invention to produce large sol-gel derived silicon-containing monoliths which may be converted to fully dense objects at temperatures very much lower than those traditionally required for ceramics and glass processing.

These and other objects as will herinafter become more apparent result from a process wherein a silicon-containing sol is formed in the presence of a drying control chemical additive selected from the group consisting of glycerol, formamide, oxalic acid and other acids having the formula $C_nH_{2(n-1)}O_{2n}$, casting the drying control chemical additive-containing sol, gelling said cast sol, drying said gelled cast sol, and densifying said dried gel.

The instant invention makes it possible to control the ultrastructure of the gel solid and pore phases by chemical means so that gelation, aging, drying, and densification of the sol-gel derived monoliths may be performed rapidly in tens of hours instead of tens of days without cracking. By the practice of this invention, it is possible to increase the surface area of a gel and decrease pore size by a factor as much as 200% for a given R mole ratio (H$_2$O/TMS). Solids with an enormous surface area, in the range of 600 m$^2$/g to 1100 m$^2$/g, are obtained without cracking. Further, the enormous surface area makes it possible to convert the dried gels to fully dense objects at temperatures very much lower those required for traditional ceramics and glass processing. For example, pure SiO$_2$ generally requires melt processing temperatures in the range of 2000° C., where as fully dense SiO$_2$ has been prepared using this invention at temperatures below 900° C. Further, the range of densification temperatures of SiO$_2$ can be controlled depending on the R ratio used in making the gel, the residual water content, and the particle size in the sol. Further, fully dense Na$_2$O—SiO$_2$ glasses have been prepared using this invention at temperatures as low as 570° C.

DESCRIPTION OF THE PREFERRED EMBODIMENT

For the purposes of this discussion, the sol-gel technique will be viewed as comprising six bacic steps, (1) mixing the sol, (2) casting the sol, (3) gelling the sol, (4) aging the gel, (5) drying the gel, and (6) densification of the gel. By introducing the drying control chemical additives (DCCA) during the first step of the process wherein the sol is initially formed, it is possible to control each of the five subsequent steps.

Typical precursors for the SiO$_2$ monomer units and the Si—O—Si bonds in the structure are silicon tetraalkoxides having the general formula Si(OR)$_4$ wherein R is an alkoxide group. These compounds, known generally as tetraalkoxide silanes, include but are not limited to, tetramethoxysilane, tetraethoxysilane, tetrapropoxysilane, and tetrabutoxysilane. Tetramethoxysilane Si(OCH$_3$)$_4$ is the preferred tetraalkoxide silane. Additionally, other monomers precursors may be included as well. For example, B(OCH$_3$)$_3$ may be used as a source of B$_2$O$_3$, NaOCH$_3$ may be used as a source for Na$_2$O, and LiOCH$_3$ and LiNO$_3$ are suitable as lithia precursors for binary and ternary systems.

Where pure silicon dioxide is the desired final product, tetramethoxysilane (TMS) is preferred as the precursor for the SiO$_2$ monomer units and Si—O—Si bonds in the structure. The mixing of water with TMS forms a silica sol through the following hydrolysis and polycondensation reactions:

$$Si(OCH_3)_4 + 4(H_2O) \rightarrow Si(OH)_4 + 4CH_3OH \quad (1)$$

line 21, reaction (2), should read as follows:

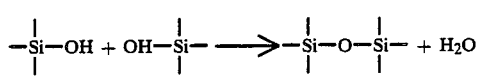
(2)

Two competing mechanisms determine the ultrastructure of the gel; one is the shelf growth of the monomer units into silica particles, the second is the linkage of the silica particles into chains and a fibrillar network.

Typically, in the first mixing step to form the sol, the DCCA is added to 5 to 40 mols of distilled water. In the preferred embodiment, wherein pure silica is produced as the end product, TMS is the precursor monomer and oxalic acid is the DCCA. Oxalic acid, in a mole ratio of 0.01 to 0.40 mole per mole of TMS is added to 5 to 40 moles of distilled water. The critical range of oxalic acid to TMS for ultrastructure drying control is from 0.1% by weight to 10% by weight. Smaller concentrations are not effective and larger percentages are uneconomical and affect the surface of the object in a negative fashion. 1 to 5 moles of TMS is added to the solution while mixing continuously for a time between 5 to 120 minutes while increasing the temperature of 70° to 100° C. Higher mixing temperatures produce a short gelation time. The presence of the DCCA permits the use of a substantially higher mixing temperature since the DCCA slows down the gelation time by approximately 2 to 6 times.

The intimately mixed sol is cast from its heated vessel into a mold in any shape that corresponds to the desired final object. The mold material is typically polyethylene, polystyrene, or polytetrafluorethylene. The duration of the casting operation is not critical since gelation does not occur until after casting is completed.

Gelation occurs in the mold with the solid object resulting taking the shape, configuration, and surface finish of the mold. Gelation times with the oxalic acid DCCA are typically 12–24 hours at 25° C., 2 to 6 hours at 70° C., and 5 minutes to 2 hours at 100° C. The solidified gel is then placed into an aging oven and at a temperature ranging from 60° to 150° C. for a fixed time ranging between 1 to 15 hours. Alternatively, the temperature of the mold or gel may be varied from 60° to 150° C. through the use of heater coils or microwave without handling of the mold or gel. During the aging process, densification of the gel occurs without drying. Aging is accomplished in a closed container and takes place under an atmosphere estalished by the vapor pressure of the pore liquid. The rate of shrinkage is greatest for the higher aging temperatures. During shrinkage liquid is being expelled or expressed from the gel into the container. During aging, the strength of the fibrillar network of the gel increases manyfold. Additionally, the DCCA gels demonstrate a much smaller and more uniform distribution of pores than those absent the DCCA material. Since larger pores serve as crack initiators during drying, their absence contributes to less cracking of the monolith. Finally, the presence of the DCCA seems to prevent the growth of individual silica particles at the expense of the fibrillar network.

The thus aged gel is now subjected to drying. Drying is carefully controlled to proceed at an evaporation rate that does not exceed the shrinkage rate of the gel. Typically, any excess liquid present after the aging process above is removed. Then the pore liquid is removed by evaporation over a temperature range between 70° to 150° C. for a fixed time varying from 18 to 96 hours. During this stage of the process, the DCCA permits controlled evaporation of the pore liquid by controling the vapor pressure thereof. As the gel is dried, those gels with an optimal ultrastructure and superior resistance to drying stresses are characterized by a change in visible optical scattering while they are dried. The optical sequence is: transparent, very slight bluish tint, white opaque, transparent, very slightly blue and finally transparent. These changes in optical properties as well as vapor pressure and weight of the gel may be used to monitor the drying process and thereby used in a feedback loop to optimize the rate of drying. Ultimately, the final stage of drying is monitored by measuring vapor pressure and weight loss. When the theoretical molecular weight of silica is reached, drying may be terminated. Surface areas of the fully dried silica monoliths prepared in this manner range from 600 m$^2$/g to 1100 m$^2$/g.

The ultraporous dried silica gels are converted to partially dense or fully dense monolith objects by heating from 150° C. up to 800°–1200° C. over a period of from 1 day to 3 days. Little change in density is observed up to 650° C. By 750° C., the silica object is at 90% density. Full density is reached between 900° C.–1200° C. depending on heating rate and the gel ultrastructure prior to densification.

By the practice of the present invention as described above, the solid silica produced can be varied from an ultraporous substance with a surface area of 1100 m$^2$/g to a full dense material. Additionally, the fully dried silica objects may be made within a 24 hour processing time. Fully dense silica materials may be made within a 1–4 day total process time at temperatures of approximately 900° to 1200° C. Additionally, any shape or size of object may be made by the DCCA silica invention by simple solution casting at temperatures no higher than 150° C. While oxalic acid represents the preferred DCCA, used in a critical range of 0.1% by weight to 10% by weight based on the weight of the precursor, glycerol in amounts up to 100 weight percent and formamide in amounts up to 100 weight percent are within the contemplation of the present invention as well.

Additionally, as mentioned above, the invention is not limited to the formation of pure silica objects. For example, alkali-silicate objects may be made essentially as described above with only small variations in the various process parameters. The major difference occurs in the densification step, the major difference in the densification being the densification temperature. Preparation of a fully densified 20 mol percent sodium oxide-80 mol percent silicon dioxide glass using a DCCA material requires only 540° to 580° C. densification temperature. Dense monolithic materials over the compositional range of from 10% Na$_2$O to 40% Na$_2$O with the remainder being SiO$_2$ can be prepared with heating to 600° C. or less.

However, the composition 20 mole % Na$_2$O 80 mole % SiO$_2$ (20N) represents a preferred embodiment. Various metalorganic precursors for the soda constituent of the gel are compared and optimized for use with tetramethoxysilane (TMS), solvent, and the DCCA method of controlling drying stresses. Suitable sodium compounds, with critical properties, are shown in Table 1, form a noncrystalline homogeneous 20N soda silicate sol upon reacting with polysilicic acid formed with TMS. The ten compounds represent a broad range of solubilities in either water or organic solvents and also a broad range of bond energies.

An equivalent sequence of four processing stages is used to make the gel monoliths from the various sodium precursors, as shown in Chart 1. However, the nature of the solvent, the pH, temperature of mixing and R ratio (H$_2$O/TMS) is varied for each precursor. Table 2 summarizes the values of these processing variables for each sodium precursor.

Details of the four processing stages are as follows:

(i) The hydrolysis and polymerization reactions will occur simultaneously in the first stage as mixing occurs. The polymerization of silica and formation of the soda silicate bonds will continue throughout gelation.

(ii) The ratio of total solvent to TMS is typically 85%. Suitable solvents are methanol and water, as indicated in Chart 1 and Table 2, according to the solubility of the various sodium precursors, Table 1. Formamide may be used as the DCCA in a 50/50 volume ratio to the methanol solvent although other ranges may be used as well. In the case of the glycerol DCCA with methanol, a volume ratio of 1/99 is suitable.

(iii) TMS and a selected sodium compound are mixed with a suitable solvent under controlled temperature, as indicated in Table 2.

(iv) The choice of quantity of water used for hydrolysis depends on whether the solution is basic or not. For a basic medium the water ratio is chosen so that the gelation of the mixture is completed in about 3 minutes after removal from the 0° C. mixing bath (see Table 2).

(v) After finishing the sol preparation (Stage 1, Chart 1), the sol is cast into a polypropylene container and put into a fixed temperature oven for gelation (Stage 2, Chart 1) and further aging for a fixed time (Stage 3, Chart 1). The gelation and aging temperatures may range from 60° C. to 125° C. and the aging times from a few minutes to 1.5 hr.

(vi) The fourth stage of drying control requires controlling the rate of evaporation of the pore liquid from the wet gel. The pore liquid evaporation rate is primarily controlled by adding the DCCA into the solution in the first stage of processing. The presence of the DCCA slows down the rate of evaporation so that it does not exceed the rate of rearrangement of the necks among particles while the gel shrinks.

(vii) During drying, the oven temperature is typically slowly increased from 60° C. to 125° C. in order to accelerate the evaporation rate. Drying at the higher temperature is desirable since it accelerates new bond formation during the rearrangement of the soda-silicate particles as the pore liquid is removed.

(viii) By following this procedure with NaOH or NaOCH$_3$ precursors, dried monolithic gels with the nearly theoretical molecular weight of 20 mol % Na$_2$O-80 mol % SiO$_2$ may be obtained with a total processing time of about 24 hours. A number of other sodium precursors produce acceptable monoliths through the gelation and the aging stages but crystallization of the gel occurs during drying. The crystals are due to reaction of the sodium with air, forming sodium salts.

Of the various sodium precursors tested (Table 1) only sodium methylate and sodium hydroxide give homogeneous fully polymerized gels without formation of precipitates during gelation and/or crystallization during drying. As the chemical reaction below shows

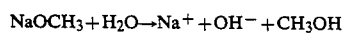

sodium methylate and sodium hydroxide behave the same in the hydrolysis reaction with TMS.

During aging (Stage 3), a higher solvent ratio to TMS results in more shrinkage. This is an important finding for several reasons; if the packing density of the gel particles is low the gel is soft and gelatinous. This is because the chains of the very small silicate particles are slightly flexible like small glass fibers. Consequently such a flexible gel can shrink considerably without cracking.

With a higher solvent ratio to TMS the surface areas of the gels are higher. This is because high solvent ratios mean a low silica concentration. When the silica concentration is high, the particles in the sol grow large before gelation sets in. At a lower silica concentration in the sol stage the particles stay small for the same gelation time and therefore the surface area is large.

The 20N gel made from sodium methylate with a solvent/total volume ratio of 85% and with formamide as a DCCA may be dried at 125° C. to nearly the theoretical molecular weight. Considerable shrinkage occurs during this drying process.

The DCCA in the 20N gel system reduces the vapor pressure of the liquid left in the pores when the gel forms. Consequently, the DCCA reduces the evaporation rate of the pore liquid at a fixed temperature during the drying stage. The drying stresses and cracking are thereby reduced as well. Thus formamide serves as an effective means of controlling drying stresses. The 20N gels maintain their monolithic shape under drying with 100% reliability. The formamide DCCA reduces the rate of evaporation proportional to the amount of DCCA added and its molar heat of evaporation.

However, the formamide DCCA causes problems in the conversion of the dried gel into glass. Since formamide (HCONH$_2$) has an active amine group, it has a strong affinity to absorb moisture from the air. The absorption occurs prefrentially on the surface of the gel and results in uneven stresses between the gel surface and the bulk and thereby produces cracks.

This surface reaction is more serious in a fully dried gel than in a half dried gel. The stresses are sufficiently great in fully dried gels that they crack explosively when exposed to air. Reducing the quantity of formamide is only a partial solution. Only complete removal by thermal or chemical treatment eliminates the hydration cracking. Another alternative is to use a DCCA which does not produce a reaction with moisture. Glycerol (C$_3$H$_8$O$_3$) is an alternative. However, the glycerol with its —C—O—H bond will decompose and react with the sodium ions in higher surface areas of the 20N gel bodies to form a sodium carbonate crystalline phase at a higher temperature.

X-ray diffraction of 20N gels made with glycerol as the DCCA show development of sodium carbonate during heating to 300° C. Scanning EM micrographs also show evidence of the carbonate crystals on the gel surface exposed to air, whereas there are no crystals in the freshly fractured bulk of the gel. This behavior is similar to the $Na_2O-SiO_2$ gel system made without the use of DCCA chemicals. Thus, the primary advantage offered by use of the DCCA is control of the large shrinkage stresses during drying. However, the residual DCCA left in the pores can lead to subsequent environmental instability. This is especially true for formamide which produces explosive hydration stresses when exposed to moisture. Glycerol is a very much less reactive DCCA and does not induce moisture sensitivity to the gels. However, glycerol still produces a sodium carbonate reaction during heating due to formation of $CO_2$ when it decomposes. The resulting sodium carbonate compounds make it difficult to control the gel-glass transformation. This is due to bloating that occurs when the surface carbonate decomposes first, the surface layer densifies, followed by decomposition of the carbonate in the interior of the gel. Removal of residual glycerol the only way to prevent this problem.

An optimum monolithic fully dried 20N gel can be obtained with 100% certainty by using the combination of TMS, sodium methylate, methanol, water and a drying control chemical additive (DCCA) and an optimized DCCA aging and drying procedure.

A stronger dried gel is gained by increasing the solvent to TMS ratio. This is because the particle growth in the sol is slow in a low concentration of TMS and a more fibrillar network is formed during the sol-gel transformation. Thus, at the time of gelation the number of chemical bonds among the small particles is greater than for a large particle size gel. The stronger gel resists cracking.

By use of formamide as a DCCA in the pores of the small particle gel the rate of evaporation of pore liquid from the gel monolith during the drying stage is controlled. However, formamide causes environmental instability when dried gels are exposed to moisture. This is due to absorbed water reacting with amine groups of the residual formamide on the gel pore surface causing uneven stresses between the surface of the gel and the bulk.

Glycerol as a DCCA also controls the rate of pore liquid evaporation and results in 100% reliable formation of dried 20N gel monoliths. There is no moisture sensitivity with the 20N gel monoliths made with a glycerol DCCA. The gels can be heated to several hundred °C. without problems. However control of full densification and the gel-glass transformation is difficult due to formation of sodium carbonates which leads to bloating during high temperatures.

Also suitable is a 20 mole % $Li_2O$-80 mole % $SiO_2$ gel (20L system). Consequently, a number of soluble lithium compounds were investigated as possible lithia precursors to determine their effect on gel processing variables for the 20L system. Throughout the study formamide ($NH_2CHO$) was used as a DCCA.

Nine lithium compounds were chosen as potential lithia precursors, and are listed in Table 3. Initially a quantitative screening procedure based on the cracking of the monolithic gels, was used to assess the suitability of the precursors. The processing steps used to make the sols and gels was kept constant in order to compare the various lithia precursors. Chart 2 shows the basic procedure used in this screening study. Processing variables were controlled as follows:

(a) 1 g of lithia precursor was used in each case, with the volume of TMS or TEOS varied to make a 20L gel.

(b) The ratio of $CH_3OH$ to $NH_2CHO$ DCCA was 1:1, and the ratio of solvent to TMS or TEOS was kept at 1:1.

(c) The water/TMS ratios (R) was varied for each precursor such that the gelation time at 0° C. was approximately 2 minutes; i.e., enough time to stir and cast before gelation occurred.

(d) The processing temperature of 0° C. slowed the reaction rate allowing higher R ratio to be used.

(e) The sol was cast and sealed for 18 hours during aging. The gel was dried in a methanolic atmosphere by removing the top of the vial and allowing the liquor to evaporate.

This first set of experiments showed the lithium-i-propoxide ($LiOC_3H_7$) was the best organic precursor. Lithium methoxide ($LiOCH_3$) formed gels almost as easily. Since $LiOC_3H_7$ gave dark green gels, due to high impurity levels in the chemical, and has a higher molecular weight, the $LiOCH_3$ precursor was selected for further study and process optimization.

Lithium nitrate ($LiNO_3$), gave the best results for the inorganic precursor tested so it also was investigated further.

In this second set of experiments using ($LiOCH_3$) and $LiNO_3$ as lithia precursors, the processing variables R, pH and solvent/TMS ratio were optimized to give uncracked monoliths in the shortest processing time.

An uncontrolled sol has a pH 12. Reducing the pH with concentrated $HNO_3$ increases the gelation time so the processing temperature do not need to be controlled and higher R ratios can still be used. Chart 3 shows the optimized procedure for making the 20L gels with the $LiOCH_3$ precursor. Gelation and aging is similar to the process shown in Chart 2 but the gels are dried undirectionally by pouring out the liquor and leaving the gels to dry in the vial with the lid off.

Chart 3 shows the optimized procedure for 20L gels made with the $LiNO_3$ precursor. This process and precursor also results in uncracked monolithic gels within 2 days or less.

Table 3 shows the results of each $Li_2O$ precursor with both TMS and TEOS as the precursor for silica, along with the R ratio of the sol. The lithium alkoxides all produce monoliths, with $LiOCH_3$, and $LiOC_3H_7$ showing the best resistance to cracking. $LiNO_3$ is also an acceptable inorganic precursor for the 20L gels.

Optimizing the process variables involves:

(a) lowering the pH, which causes an increase in gelation time.

(b) increasing the R value to 5.

(c) increasing the solvents/TMS ratio.

For the binary $Na_2O-SiO_2$ system, a typical composition includes 67 mole % $SiO_2$-33 mole % $Na_2O$ (33N). For the ternary $SiO_2-B_2O_3-Na_2O$, system, a typical composition includes 42 mole % $SiO_3$-30 mole % $B_2O_3$-28 mole % $Na_2O$. Formamide is the DCCA studied. The DCCA materially reduces drying time requirements by binding the gel such that the increased drying rate does not destroy the monolithic character of the molded shape. Additionally addition of the DCCA modifies the dependence on the gelation time on the R ratio of the sol.

The source of $SiO_2$ in the sols is preferably TEOS, $Si(OC_2H_5)_4$. A preferred source of $B_2O_3$ is TMB, $B(OCH_3)_3$, and the preferred $Na_2O$ precursor is SMM, $NaOCH_3$ in $CH_3OH$.

A schematic representation of the processes used to produce monolithic gels is given in Chart 5. The solvent is either pure methanol $CH_3OH$, or a mixture of methanol and DCCA, in the proportion of 50 volume % each. The molarity of the acidic solution 0.14M HCL. The molarity of the basic solution varies from 0 to 7.53M $NH_4OH$. In the preferred process, a concentration of 1.20M is used.

The gels are cast in polyethylene, polypropylene, Teflon, Pyrex glass containers at room temperature, then aged at 60° C. for 24 hours. Teflon containers have the lowest adherence, regardless of the formamide content in the gel, whereas the adherence of the gel to Pyrex is a function of the DCCA content.

For the drying process, two procedures are preferred: (1) drying under an ambient oven air atmosphere or (2) drying under a reduced atmosphere of approximately 1 Torr vacuum.

TABLE 1

SOME CRITICAL PROPERTIES OF SODIUM PRECURSORS

| SODIUM PRECURSOR | MELTING POINT °C. | BOILING POINT °C. | SOLUBILITY PER 100 cc WATER OR IN OTHER | | |
|---|---|---|---|---|---|
| | | | COLD WATER | HOT WATER | SOLVENT |
| NaCl | 801 | 1413 | 35.7 | 39.12 | sl. s. al |
| NaClO | in solution only | | — | — | — |
| $NaClO_3$ | 248 | d | 79.0 | 230 | s. cl. gl,c. |
| $NaClO_4$ | d482 | d | s | v. s. | s. cl. |
| $Na_2CO_3$ | 851 | d | 7.1 | 45.5 | sl. s. al. |
| NaOH | 318.4 | 1390 | 42 | 347 | sl. s. cl. gl,c. |
| $NaOCH_3$ | d-$CH_3OH$ | — | S. d | — | S. MeOH |
| HCOONa | 253 | d | 97.2 | 160 | sl. s. al |
| $CH_3CO_2Na$ | 324 | — | 119 | 170.15 | sl. s. al |
| $NaNO_3$ | 306 | d380 | 92.1 | 180 | s. al. |

Sl. s. al. = slightly soluble in alcohol
s. al. = soluble in alcohol

TABLE 3

Lithia Precursor Cracking/No Cracking Results

| Lithia Precursor | Silica Precursor | |
|---|---|---|
| | TMS | TEOS |
| Lithium Methoxide $LiOCH_3$ | Cracking Clear Yellow Gel R = 1.75 | No Cracking Clear Yellow Gel R = 2 |
| Lithium-i-Propoxide $LiOCH_3H_7$ | No Cracking Dark Brown Gel R = 2 | No Cracking Dark Brown Gel R = 2 |
| Lithium-t-Butoxide $LiOC_4H_9$ | No Cracking Dark Yellow Gel R = 2 | No Cracking Dark Yellow Gel R = 2 |
| Lithium Hydroxide LiOH | Cracking White Gel R = 1.5 | Cracking White Gel R = 1.5 |
| Lithium Phenoxide $LiOC_6H_5$ | Cracking Dark Green Gel R = 1.5 | Cracking Dark Brown Gel R = 2 |
| Lithium Acetate $LiOOCCH_3$ | Cracking White Gel R = 2 | No Gel Formed |
| Lithium Benzoate $LiOOCC_6H_5$ | Cracking White Gel R = 2 | Cracking White Gel R = 2 |
| Lithium Oxalate $Li_2C_2O_4$ | No Gel Formed No Cracking | No Gel Formed No Cracking |
| Lithium Nitrate $LiNO_3$ | Clear Gel R = 2 | Clear Gel R = 2 |

TABLE 2

THE OBSERVATION OF SOME SODIUM PRECURSORS REACT WITH TMS

| SODIUM PRECURSOR | SOLVENT | VOL. % | MIXING TEMP °C. | pH | R | OBSERVATION GELATION | AGING | CONCLUSION DRYING |
|---|---|---|---|---|---|---|---|---|
| NaCl | $H_2O$ | 85 | 90 | 2–8 | 45 | Precipitate White Color | | |
| NaClO | MeOH | 85 | 25 | 7–10 | 0 | Good Blue Transparent Gel | | Crystallization Inside Gel Body |
| $NaClO_3$ | $H_2O$ | 85 | 90 | 2–7 | 45 | Good Blue Transparent Gel | | Color Changed to White Crystallized |
| $NaClO_4$ | $H_2O$ | 85 | 90 | 2–7 | 45 | Good Blue Transparent Gel | | White Color Crystallized |
| $Na_2CO_3$ | $H_2O$ | 85 | 90 | 9–12 | 45 | Good Blue Transparent Gel | | Precipitate |
| NaOH | MeOH | 85 | 25 | 10–13 | 2 | Good Blue Transparent Gel | | Good Blue Transparent Gel Under MeOH Atm. |
| $NaOCH_3$ | MeOH | 85 | 0 | 10–13 | 2 | Good Blue Transparent Gel | | Good Blue Transparent Gel Under MeOH Atm. |
| NCOONa | $H_2O$ | 85 | 90 | 2–6 | 45 | Good Blue Transparent Gel | | Crystallized Inside Gel Body |
| $CH_3COONa$ | $H_2O$ | 85 | 90 | 2–7 | 45 | Good Blue Transparent Gel | | Crystallized Inside Gel Body |
| $NaNO_3$ | $H_2O$ | 85 | 90 | 2–7 | 45 | Good Blue Transparent Gel | | Crystallized Inside Gel Body |

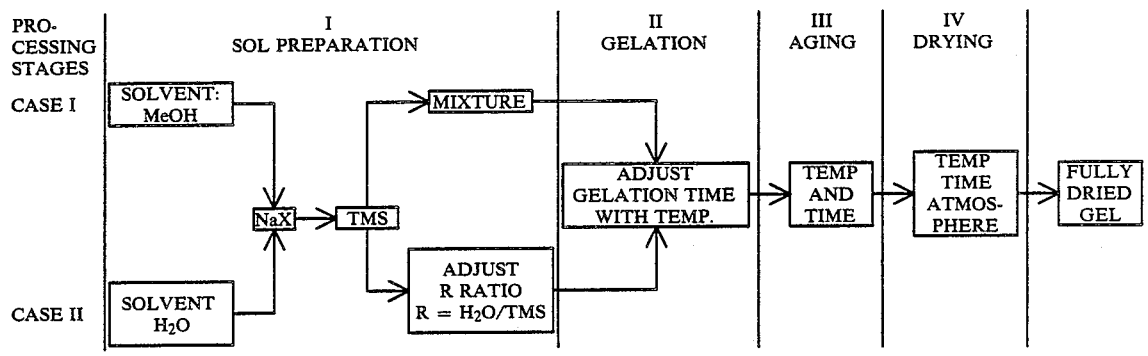
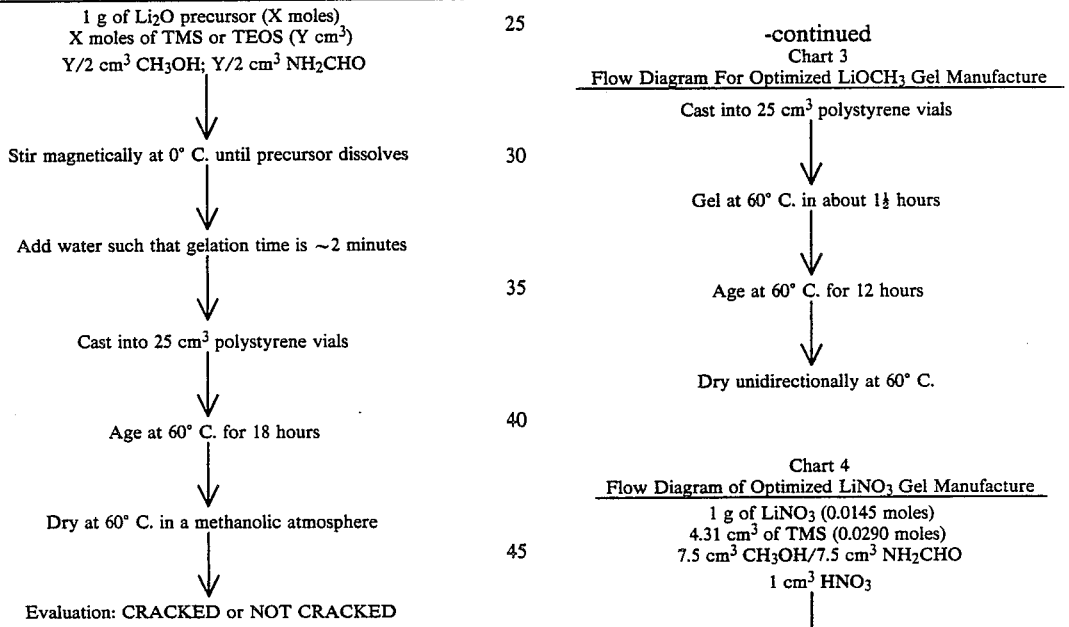
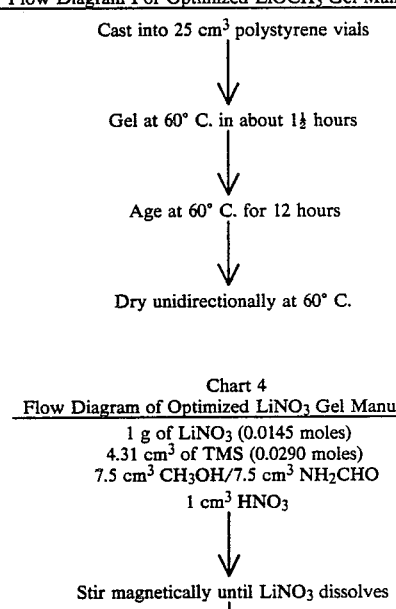
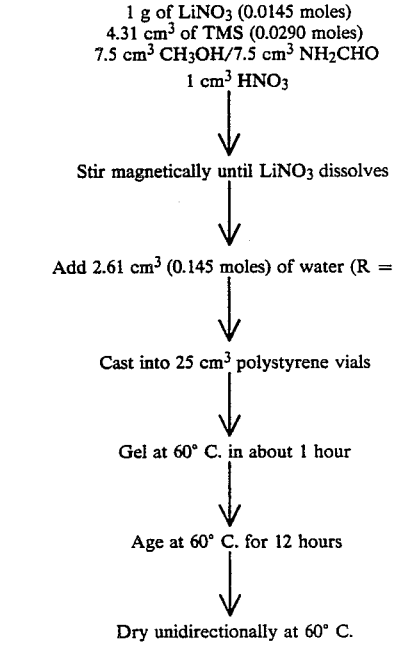

-continued
Chart 4
Flow Diagram of Optimized LiNO₃ Gel Manufacture

| (a) | (b) |
|---|---|
| CH₃OH + DCCA | CH₃OH + DCCA |
| TEOS | TEOS |
| H₂O + HCl | H₂O + HCl |
| SMM | TMB |
| Cool 0° C. | H₂O + HCl |
| H₂O + NH₄OH | SMM |
| | Cool 0° C. |
| | H₂O + NH₄OH |

Chart 5

Schematic diagram of sol-gel processes for (a) binary 33N and (b) ternary 42S-28N-30B gel derived monoliths.

Having now generally described the invention, a better understanding may be obtained by reference to the following examples, which are provided herein for purposes of illustration only and not intended to be limiting unless otherwise specified.

EXAMPLE 1

0.1 mole (9.0 g) of oxalic acid is added to 10 moles (180 g) of distilled water. To this solution, 2 moles (304 g) of TMS is added while mixing continuously for 120 minutes, while the temperature is increased to 70° C. The intimately mixed sol is cast into a shallow rectangular polyethylene mold. The mold is maintained at ambient temperatures, 25° C., with gelation occurring in approximately 24 hours. This solidified gel is then placed in an aging oven at a temperature of 60° C. for a time of approximately 15 hours. During this aging process, a linear shrinkage of approximately 15% occurs. Excess liquid is removed from the gel mold and the gel subjected to evaporation at a temperature of 75° C. for a period of approximately 32 hours. The fully dried silica monolith prepared in this manner has a surface area of 850 m²/g. The resulting ultraporous dried silica gel shape is converted to a fully dense monolithic object by heating up to 1050° C. during a two day period.

EXAMPLE 2

Example 1 is repeated with the exception that formamide is used as the DCCA, 10 mole % of formamide based on TMS being used. A large fully dense monolithic silica object results, the formamide providing the necessary control of the gel ultrastructure.

EXAMPLE 3

Example 1 is repeated with the exception that glycerol is used as the DCCA, 15 mole % of glycerol based on TMS being used. The resulting monolithic gel is final fired at 720° C. to produce a monolithic shaped silica article having a density approximately 90% that of fully densified silica.

EXAMPLE 4

2 moles of a silicon-containing precursor which is a binary mixture of NaOCH₃ and TMS such that the final product is a 20 mole % Na₂O-80 mole % SiO₂ product and 0.1 mole of oxalic acid are mixed together with 10 moles of water. The processing conditions of the mixing, casting, gelling, aging and drying steps of Example 1 are repeated. The final dried gel is fully densified at 600° C. to form a crack-free monolith.

Having now fully described the invention, it will be apparent to one of ordinary skill in the art that many changes and modifications can be made thereto without departing from the spirit and scope of the invention as set forth herein.

What is claimed is:

1. A method for producing a crack-free sol-gel derived silicon-containing gel monolith comprising
    (1) forming a silicon-containing sol comprising SiO₂—B₂O₃—Na₂O in a proportion of 42 mole % SiO₂, 30 mole % B₂O₃ and 28 mole % Na₂O and a drying control chemical additive, said drying control agent enabling the formation of a crack-free gel monolith under drying conditions of elevated temperatures of between 70° and 150° C. for a period of between 18 hours and 96 hours;
    (2) casting said sol;
    (3) gelling said cast sol; and
    (4) drying said gelled cast sol to form a crack-free gelled monolith.

2. The method of claim 1 wherein the drying control chemical additive is selected from the group consisting of glycerol, formamide, oxalic acid and acids of the formula $C_nH_{2(n-1)}O_{2n}$ and mixtures thereof.

3. The method of claim 2 wherein said sol is formed from tetramethoxysilane, a trimethoxy boron and a sodium methoxide.

4. The method of claim 3 wherein oxalic acid is added in an amount of from about 0.1 to about 10 weight percent of the tetramethoxysilane, trimethoxy boron and sodium methoxide.

5. The method of claim 2 wherein the drying control chemical additive is oxalic acid.

6. The method of claim 5 wherein said silicon-containing sol is formed from tetraethoxysilane, trimethoxy boron and sodium methoxide.

7. The method of claim 6 wherein oxalic acid is added in an amount from about 0.1 to about 10 weight percent of the tetraethoxysilane, trimethoxy boron and sodium methoxide.

8. A crack-free sol-gel derived silicon-containing gel monolith made by the process of claim 1.

* * * * *